UNITED STATES PATENT OFFICE.

WILBER R. MEEDS, OF NEWARK, OHIO.

LANTERN-OIL.

SPECIFICATION forming part of Letters Patent No. 266,859, dated October 31, 1882.

Application filed March 11, 1882. (No specimens.)

*To all whom it may concern:*

Be it known that I, WILBER R. MEEDS, of Newark, in the county of Licking and State of Ohio, have invented certain new and useful Improvements in Lantern-Oils; and I do hereby declare that the following is a full, clear, and exact description of the invention, which will enable others skilled in the art to which it appertains to make and use the same.

My invention has relation to lantern-oil which, while adapted for general use, is specially designed for railroad and ship lanterns, or signal-lanterns of any kind, where it is important to have a bright, lively, and steadily-burning flame, and an oil which is not readily "chilled" or frozen by exposure to cold weather.

The improvement consists in the specific combination of the several ingredients hereinafter specified in about the proportions set forth, by which I obtain an improved illuminating-oil which fulfills all the requirements of a strictly first-class lantern and signal oil, while its cost is considerably less than the first-quality lard and sperm oils which are now generally used for signal purposes.

To prepare my improved illuminating oil, I use the following formula, viz: eight pints No. 1 commercial lard-oil; nine pints illuminating-oil of 300° fire-test; four pints refined tallow-oil, and one-half pint turpentine to every five gallons of the above mixture.

The advantage of using in the above formula refined tallow-oil instead of strained tallow is that by the process of refining the oil all the stearine contained in the tallow is removed, which prevents it and the compound of which it forms a part from chilling in cold weather by crystallizing of the stearine.

In mixing the several ingredients the refined tallow-oil should first be heated to from 130° to 150° Fahrenheit; the proper proportions of lard-oil and illuminating-oil are then added; the whole is thoroughly agitated and left to cool down to 60°, or thereabout, after which the proper proportion of turpentine is added, and the whole mass is thoroughly stirred or agitated until cool, when it is ready for use.

A given quantity of this oil will burn as long as the same quantity of first-class (commercial No. 1) lard-oil, will give as clear and bright a light, and the flame produced by it will "raise" quicker, after waving the lantern for signaling, than a lard-oil flame; nor will the oil congeal in the lantern if the latter is lighted just after filling, as lard-oil is apt to do, because it is of such consistency that the least amount of heat will keep it sufficiently fluid for perfect capillary absorption by the wick; nor will it gum or turn rancid in warm weather, owing to the antiseptic qualities of the turpentine.

To produce the best results experience has convinced me that the formula herein given should be strictly followed, both as to the nature of the ingredients, their quantities, and manner of compounding.

I am aware that illuminating and lubricating oils have been made before by mixing petroleum or coal-oil with melted lard or tallow, with the aid of heat, and that the combination of any of the mineral oils, either in a crude or refined state, with any one of the vegetable or animal oils or fats—such as palm-oil, or fish-oil, or other fatty substances—is not new; nor do I claim such mixtures or compounds, broadly; but

What I claim, and desire to secure by Letters Patent of the United States, is—

In the manufacture of lantern or signal oils, the herein-described compound, consisting in the admixture, with a compound composed of commercial lard-oil, commercial illuminating-oil—that is, a mixture of lard-oil and kerosene—of 300° fire-test, and turpentine, in the proportions set forth, of a quantity of refined tallow-oil equal in bulk or volume to one-half the volume of the commercial lard-oil, (irrespective of the lard-oil contained in the commercial illuminating-oil,) as specified.

In testimony that I claim the foregoing as my own I have hereunto affixed my signature in presence of two witnesses.

WILBER REED MEEDS.

Witnesses:
GEORGE DOUGLAS GRASSER,
SAMUEL PARR MOORE.